Nov. 30, 1937.                G. L. FULK                 2,100,776
            MACHINE AND METHOD FOR MAKING MANIFOLD FORMS
                    Filed Feb. 10, 1936        3 Sheets-Sheet 1

INVENTOR.
GEORGE L. FULK
Bates, Goldrick & Teare
ATTORNEYS.

Nov. 30, 1937.  G. L. FULK  2,100,776
MACHINE AND METHOD FOR MAKING MANIFOLD FORMS
Filed Feb. 10, 1936 3 Sheets-Sheet 2
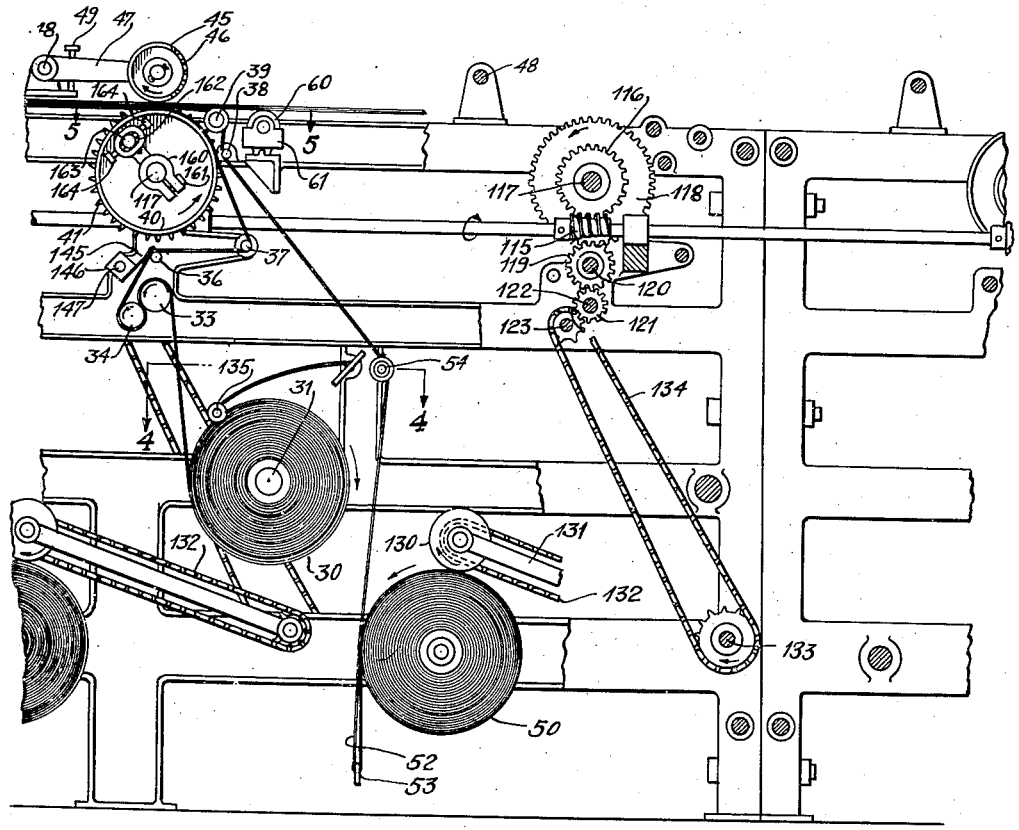
Fig.3
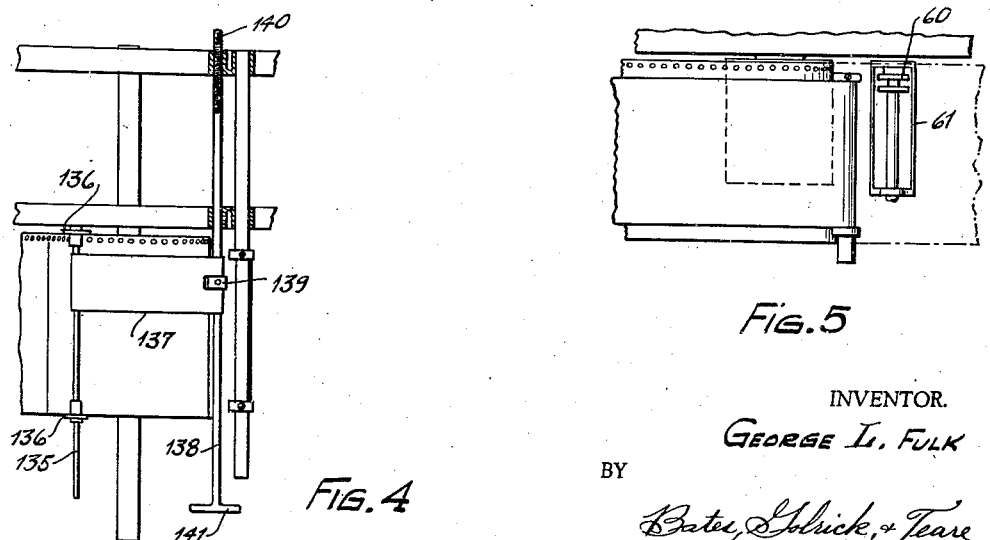
Fig.4
Fig.5
INVENTOR.
GEORGE L. FULK
BY
Bates, Golrick, & Teare
ATTORNEYS Nov. 30, 1937.  G. L. FULK  2,100,776
MACHINE AND METHOD FOR MAKING MANIFOLD FORMS
Filed Feb. 10, 1936  3 Sheets-Sheet 3
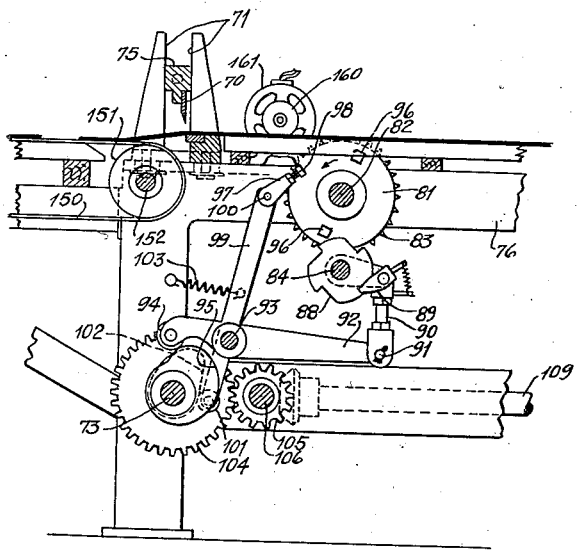
FIG. 6
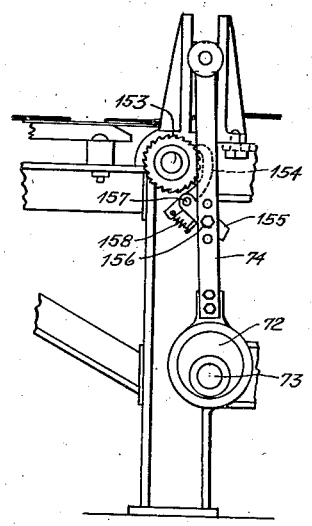
FIG. 7
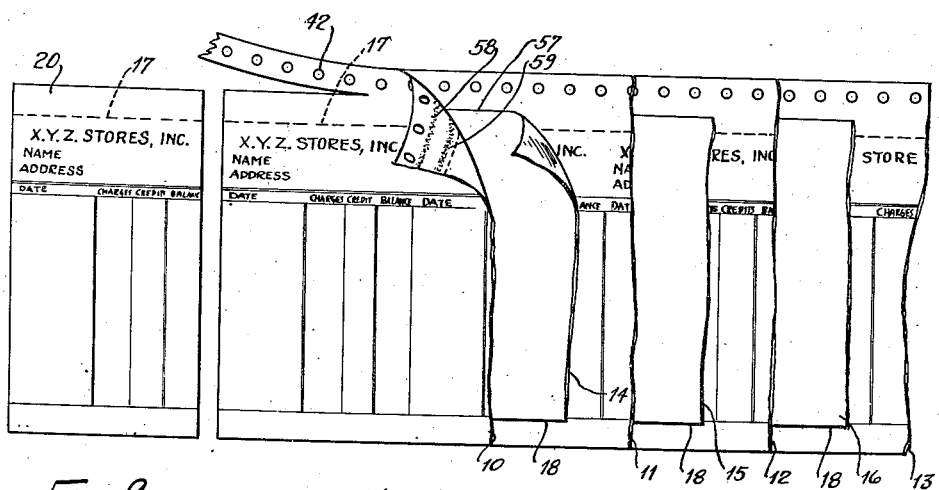
FIG. 9  FIG. 8
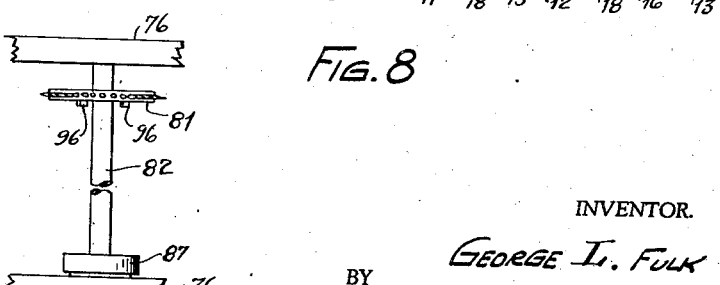
FIG. 11
INVENTOR.
GEORGE L. FULK
BY
ATTORNEYS.

Patented Nov. 30, 1937

2,100,776

UNITED STATES PATENT OFFICE 2,100,776

MACHINE AND METHOD FOR MAKING MANIFOLD FORMS

George L. Fulk, Berkeley, Calif., assignor to Carbon Interleaved Forms Corporation, Norwalk, Ohio, a corporation of Ohio Application February 10, 1936, Serial No. 63,282

9 Claims. (Cl. 270—52)

This invention relates to a method and apparatus for making manifold records, in which one time carbons are employed for making a record and in which the carbons may be quickly removed from their position in a pack at the completion of the record. Manifold packs of such character usually have three or more record sheets with interleaved transfer strips that form a single unit and frequently a large number of units are fastened together in superimposed relationship to form a pad.

An object of the present invention is to provide a method and apparatus for making a manifold pack, which will enable the interleaved transfer strips to be accurately positioned between the record strips and which will enable the transfer strips to be snapped out of position between the record strips at the completion of the record.

An additional object is to provide a method whereby the manifold units may be continuously made at a high rate of speed and in which accurate registration may be maintained so as to assure uniformity in width of various units.

A further object is to make a machine in which units may be made with a selective number of record and transfer sheets and in which the various operations of interleaving, fastening and shearing may be accomplished in a single machine.

Figure 1:
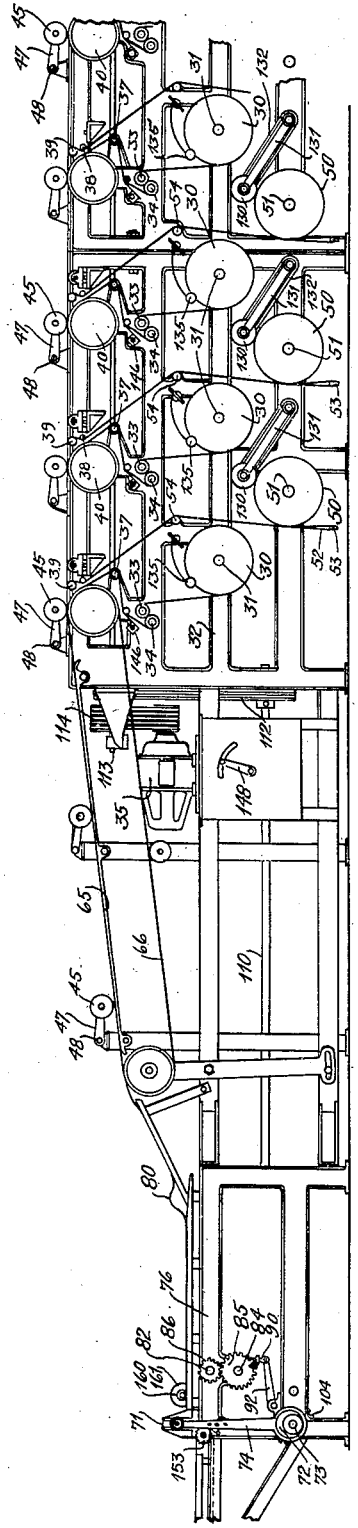
Figure 2:
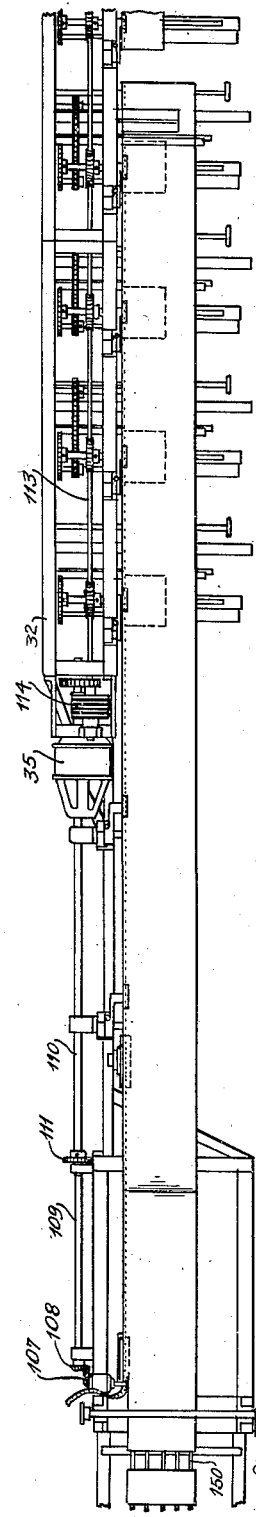
Figure 10:
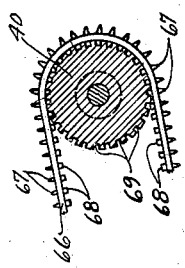

Referring now to the drawings, Fig. 1 is a side elevation of a machine embodying my invention; Fig. 2 is a top plan view of the machine; Fig. 3 is a side elevation, partly in section, of a portion of the machine, but shown on a larger scale than that illustrated in Fig. 1; Figs. 4 and 5 are sections taken on the correspondingly numbered lines in Fig. 3; Fig. 6 is a vertical section taken on a scale larger than that shown in Fig. 1 and illustrates a fragmentary part of the apparatus adjacent the delivery end thereof; Fig. 7 is a side elevation of a portion of the apparatus illustrated in Fig. 6; Fig. 8 is a view illustrating the manner in which the superimposed record and transfer strips are assembled; Fig. 9 is a view of a unit after it has been separated from the assembled strips; Fig. 10 is a fragmentary view of part of the conveyor belt that is used in transferring the assembled forms onto the shearing table, and Fig. 11 is a top plan view through part of the shearing off table with the top thereof removed.

The manifold pack with which my invention is concerned includes any number of record strips, such for example, as are indicated in Fig. 8 at 10, 11, 12, and 13 with interposed transfer strips 14, 15, and 16. The record and transfer strips are fastened together preferably with adhesive along one edge above the perforation line 17, while the lower edges 18 of the transfer strips terminate above the bottom edges of the record strips. This arrangement enables the operator to grasp the tab portion 20 above the perforated line with the thumb and forefinger of one hand, and to grasp the record strips in the overhanging portion beneath the lowermost edges of the transfer sheets with the thumb and forefinger of the other hand, and then to snap the two portions apart, thus leaving the detached record strips as a unit in one hand and the detached transfer strips as a unit in the other hand. The transfer strips are then discarded and the record strips are filed for future use.

To make the pack illustrated in Fig. 9, I take rolls of record strip on which the desired forms are printed, and I provide a series of openings along a longitudinal edge of each strip. I utilize the openings for receiving projections on feed rolls to hold the strips in registration during the assembling operation. The record strip rolls are indicated in Fig. 1 at 30, as being freely movable on a support, such as a bar 31. These bars are shown as extending laterally from a frame 32, and as corresponding in number to the required number of record sheets that may be used to form a desired pack. Fig. 3 shows the arrangement on a somewhat larger scale in which the web from the roll is fed between rollers 33 and 34, which are power-driven by an electric motor 35. After the web passes through the feed rollers, it passes upwardly and around guide bars 36, 37, 38, and 39, after which it passes over a drum 40. All of such drums, except that nearest to the motor carry radially extending pins 41 that project into openings 42 that are arranged in a line adjacent the longitudinal edge of the web.

A roll 45 bears against the upper side of the web and has recesses 46 for receiving the pins 41 and coacting therewith to hold the web against the drum. The roll 45 is journalled at the free end of an arm 47 which in turn is pivoted at 48 on the frame; and the arm is provided with a threaded member 49 for adjusting the relative position between the roll and the drum.

The transfer strips are arranged to be inserted between the record strips, and to this end, I have shown transfer strip rolls 50 which are journalled on bars 51 that are carried by the frame 32. The web from each transfer roll extends downwardly in a loop 52 in which a weight 53 is cradled, thence upwardly around a guide bar 54, thence around guides 38 and 39, from whence it passes between the adjacent webs of record strips and over the drum 40. The transfer strips and the record strips are connected together preferably by adhesive, during the assembling operation.

The adhesive is applied by a paste roller 60 which is journalled in a paste container 61 and is positioned to contact the underside of a record strip along the upper reach thereof, as is shown in Figs. 3 and 5. The paste roller has two contacting surfaces, one of which forms an adhesive line 58 by means of which the adjacent record strips are fastened together, and the other of which forms a line 59, by means of which the back of each transfer strip is fastened to the back of the superimposed record strip. The upper edge 57 of the transfer strip terminates between the adhesive lines 58 and 59, while the adhesive line 58 is below the line of perforations 42.

As the record strips and the interposed transfer strips reach the drum nearest the motor, they pass down an inclined runway 65 along which the upper region of an endless belt 66 is moved. The belt has spaced pins 67 projecting outwardly therefrom at regular intervals, for engagement with the registering openings 42 in the record sheets, and similarly spaced pins 68 on the underside thereof which engage pockets 69 in the drum 40 that is nearest to the motor. The projections on the belt are in alignment with those on the drums 40 wherefore, the belt serves to continue the propulsion of the superimposed strips and holds them in registration so that they may be sheared to uniform size.

The shearing operation which I utilize necessitates an intermittent motion of the assembled pack, and hence it is necessary not only to feed the strips accurately and in registration with each other, but also to momentarily hold a portion of the strips stationary until the shearing operation is completed, while at the same time allowing an uninterrupted continuous movement of the strips in the assembling part of the machine. The shearing is accomplished by a cutter 70 which is adapted to be reciprocated vertically within a guideway 71, by an eccentric 72 which is rigid with a shaft 73. The eccentric is connected by a rod 74 to the carrier 75 on which the cutter 70 is mounted. The cutter is positioned adjacent a table 76 on each side of which the eccentrically operated rods 74 are disposed and across which the shaft 73 is journalled. The shaft in turn is operated in timed relationship to the assembling mechanism by suitable gearing from the motor 35.

To feed the assembled pack intermittently beneath the cutter while allowing the assembling mechanism to operate continuously, I allow a loop or fold 80 to be formed in the continuous pack after it leaves the belt 66 and before it reaches the cutter. Between the looped portion and the cutter, I provide a mechanism for holding the pack stationary until the forms are cut, and then for moving the pack forwardly with sufficient speed to keep the size of the loop uniform and yet to stop the pack exactly at the right position for the next shearing operation.

Such intermittently operated mechanism may comprise a wheel 81 which is rigid with a shaft 82 that is journalled in the frame of the table 76. The wheel has pins 83 projecting radially from the periphery thereof for engagement with the line of openings 42 in the pack, and is adapted to be rotated in the direction shown by the arrow in Fig. 6. The shaft 82 receives rotation from a shaft 84 through gears 85 and 86 (Fig. 1), while a spring friction brake 87 places sufficient resistance upon the shaft to hold it against movement and to assist in bringing it to an abrupt stop preparatory to the cutting operation.

To operate the shaft 84 I have shown a ratchet 88 which is actuated by a pawl 89 that is mounted on the upper end of a link 90. The lower end of the link may be pivotally connected at 91 to a lever 92 which in turn is pivotally mounted at 93 on a support that projects from the table frame. The lever 92 carries a cam roller 94 which is adapted to engage a cam 95 on the shaft 73. Thus, when the cam roller 94 is lifted, the pawl 89 is forced downwardly, and the shaft 84 is thereby rotated. This, in turn, through the gears 85 and 86 effects rotation of the driving wheel 81. The gear ratio between the shafts 84 and 82 is sufficient to move the pack at a faster rate than the surface speed of the webs in the assembling mechanism, so as to allow sufficient time for performing the shearing operation and yet to maintain the loop 80 substantially uniform in size.

To stop the driving wheel 81 at the exact desired position, I have shown blocks 96, on one face of the wheel 81, which are adapted to be engaged by a finger 97. The finger is arranged to be moved into and out of the path of the blocks in timed relationship to the mechanism for driving the wheel, so as to clear one block and thereby to allow the wheel to turn at the required instant, and so as to move back into the path of the next block; the distance between the blocks along the periphery of contact being equal to the length of the severed form. The end of the finger comprises an adjusting screw 98 by means of which micrometer adjustment between the finger and block may be obtained.

The finger 97 is illustrated, as comprising one end of a lever 99 which is pivoted immediately at 100 to a part of the table frame. The lower end of the lever carries a cam roller 101 which is held into engagement with a cam 102 on the shaft 73 by means of a spring 103. The position of the cams 95 and 102 on the shaft 103 is such that the finger 97 clears the upper stop block just before the wheel 81 is set in motion to feed the assembled pack beneath the cutter, and to return the finger back into the path of the next block, as soon as the first one has been cleared.

The shaft 73 may be driven by a gear 104, which meshes with a gear 105 on a cross shaft 106. This shaft in turn carries a bevel gear 107 that meshes with the bevel gear 108 on the shaft 109. The shaft 109 is connected to a shaft 110 through gearing 111 while the shaft 110 in turn is rotated by a chain belt 112 which is shown as passing over a sprocket wheel on the pulley shaft 113. The shaft 113 is rotated by the armature shaft of the motor through a belt 114.

The pulley shaft 113 therefore, not only operates the shearing and intermittent feed mechanism, but also operates the assembling mechanism and to this end I have shown the shaft in Figs. 2 and 3, as extending along the frame 32, and as having a worm 115 fixed thereto adjacent each drum 40. Each worm engages a worm wheel 116 on the drum shaft 117, which is journalled in the frame. The drum shaft is shown as carrying a gear 118, which meshes with a gear 119 on a lay shaft 120. This last named shaft carries a gear for meshing with the gear 121 on a shaft 122, which carries a feed roll 33. The feed roll 34 is also adapted to be driven by the shaft 123 through a gear 124, which meshes with the gear 121. Thus, there is a positive drive between the pulley shaft and the record strip feed rolls.

For correcting the tension on the upper reach of the webs and for allowing a slight adjustment to accommodate any inaccuracy in the spacing of the openings 42, I provide an adjustable connection between each drum 40 and its associated driving shaft 117. This connection comprises an arm 160 which is rigidly mounted on the shaft, as by a clamping screw 161, and which contacts a slot 162 for receiving a pin 163 that is fixed to the end wall of the drum. The relative position of the pin within the slot may then be varied and locked by adjusting screws 164. For the purpose of facilitating such adjustment the drums are open at the outer ends as is shown for example in Fig. 3.

It is important that the transfer strips be unwound from their respective rolls at the same surface speed, as that of the record strips, and to this end, I prefer to unwind the transfer rolls by frictional contact against the surface thereof. This is preferably accomplished by a roll 130, which is journalled in an arm 131, and which is held by gravity into contact with the outer surface of the transfer roll 50. The roll 130 may be driven by a sprocket chain 132 from a shaft 133, which in turn may be rotated by a chain 134 that passes over a sprocket wheel on the shaft 123. Thus, the rate at which the transfer strip is fed into the assembled pack remains constant, notwithstanding the fact that the size of the roll diminishes, as the web is unwound therefrom.

To retain the record strip rolls in accurate lateral alignment, I have shown a gravity actuated bar 135, which carries guide rolls 136 (Fig. 4) that are free to rotate, but after being properly adjusted, are locked against axial movement along the bar. These rolls are shown, as having hub portions, which rest upon the edges of the record strip rolls, and as having flanged portions, which bear against the vertical faces of the rolls. The bar 135 is carried by a plate 137, which is shown as being pivotally mounted on a bar 138; the latter being held against axial movement by a collar 139 which is fixed to the bar. The bar 138 is so carried on the frame that its axis is substantially parallel to that of the roll shaft 31, and is further so mounted that it can be shifted axially so as to vary the position of the record strip roll slightly, and thereby maintain its alignment with other rolls during the assembling operation. The axial movement of the bar 138 may be accomplished by having one end of it threaded, as at 140 and engaging a correspondingly threaded opening in the frame. The opposite end of the bar may have a handle 141 by means of which it may be turned whenever desired.

To smooth out any wrinkles which may occur in each record strip web, I have shown a brush 145 (Fig. 3), which bears against the web, after it passes through the feed rolls, and which is adjustable to vary the pressure against the web. The brush is shown, as being carried in a block 146 that is pivotally mounted on the support 147, and the support, in turn, is carried by the frame.

From the foregoing description, it will be apparent that a single motor is used for operating all of the mechanism, and that the entire machine can be controlled by a single controller 148. Thus, all of the operations have a definitely timed relationship, so that the unreeling, interfitting, positioning, and shearing may be accomplished with a minimum degree of attention by an operator. The machine is adapted for making multiple part forms in any desired multiple, although I have only illustrated the machine in Figs. 1 and 2, as making a four-part form.

To move the severed forms along the table at the completion of the cutting operation, I have shown an endless belt in the form of a plurality of strips 150, which pass around a roll 151 on a shaft 152. The shaft, in turn, is journalled in the table 76 on the discharge side of the cutter 70, and may be operated intermittently by a ratchet 153 (Fig. 7) which is actuated by a pawl 154. The pawl 154 is arranged to be actuated by a bar 115, which is illustrated as being attached to one of the connecting rods 74 by a pin 156, and as pivotally supporting the pawl at 157. The spring 158 normally urges the pawl into contact with the ratchet, and so as the connecting rod moves vertically and laterally, the pawl 154 is operated to move the ratchet. This movement need only be slight, so as to prevent the severed forms from accumulating underneath the cutter.

The aligned openings 42 on the edge of each record strip are utilized merely for maintaining the webs in accurate alignment, and registration, and are removed at the completion of the assembling operation. This may be accomplished by a cutting wheel 160, which is constantly rotated by a motor 161, and which is supported on the table 76 in advance of the cutter 70.

From the foregoing description, it will be apparent that I have provided a machine, by means of which multiple part forms may be expeditiously assembled with interleaved transfer strips, and that the assembled forms may be accurately cut to the desired size, so that they are immediately available for mounting in pad form for use. The method of making manifold pads in this manner permits the economical manufacture of forms in which one-time carbons may be separated, as a unit, from the record sheets in a quick and convenient manner.

I claim:—

1. A method of making a manifold pack in which transfer strips are interleaved between record strips, comprising feeding long continuous strips of record and transfer material into interleaved relationship, securing the strips together along one edge, utilizing a row of perforations along the connected edges for maintaining the strips in registration, and then cutting off the perforated strips.

2. A method of making a manifold pack having record strips with interleaved transfer strips, comprising the utilization of uniformly spaced openings along one edge of the record sheets for maintaining the record sheets in registration until the assembly is completed, and the removal of the narrow perforated strip at the completion of the assembly operation.

3. A method of assembling a manifold pack, comprising utilizing a narrow perforated strip along one edge of the record sheets, as a guiding and feeding medium, and then removing the perforated strip at the completion of the assembling operation.

4. A machine for making manifold forms comprising a feed wheel having projections that extend therefrom and that are adapted to engage similarly spaced openings in a plurality of record sheets so as to maintain them in registration, means for interleaving transfer strips, means for connecting the transfer strips to the record strips in a region adjacent to but spaced from the openings in the record strips, and means for severing a narrow portion of record strips containing the openings at the completion of the assembling operation.

5. A method of connecting a plurality of record and transfer strips, comprising interleaving the record and transfer strips and applying adhesive in spaced lines to the underside of a record strip, whereby one line is outside the marginal edge of the transfer sheet and operates to fasten two record strips together, and the other line is inside the marginal edge of the transfer strip and operates to secure the transfer strip to the superimposed record strip.

6. A machine for making manifold forms, comprising means for supporting rolls of record and transfer strips, the record strips having uniformly spaced openings therein, means engaging the openings for maintaining the record strips in registration until the assembly is completed, and means for removing a narrow strip containing the perforations at the completion of the assembly operation.

7. A machine for making manifold forms, comprising means for supporting rolls of transfer material, means for applying adhesive to some of the record strips and means for feeding the record and transfer strips in interfitting relationship so as to connect adhesively the transfer strips to the record strips and to connect the record strips adhesively together independently of the transfer strips.

8. A machine for making manifold forms, comprising means for supporting rolls of transfer material, means for applying adhesive to some of the record strips and means for feeding the record and transfer strips in interfitting relationship so as to connect adhesively the transfer strips to the record strips and to connect the record strips adhesively together independently of the transfer strips, the record strips having a row of perforations extending along one edge thereof, and means for removing a narrow strip containing the perforations at the completion of the assembly operation.

9. A machine for making manifold forms comprising means for supporting rolls of record and transfer material in tandem relationship, means for guiding the webs of material into interfitting relationship, means for attaching the transfer strips along one edge thereof to the record strips, the opposite edges of the transfer strips terminating short of the adjacent edges of the record strips and being disconnected therefrom and means for attaching the record strips together independently of the transfer strips and adjacent those edges of the transfer strips that are attached to the record strips.

GEORGE L. FULK.